May 26, 1970 J. OSWALD 3,514,697

METHOD AND DEVICES FOR WAVE FREQUENCY DISCRIMINATION AND DIGITAL MEASUREMENT, USING SAMPLING AND LOGIC CIRCUITS

Filed March 27, 1967 3 Sheets-Sheet 1

Inventor
Jacques Oswald
By
Edwin E. Greigg

May 26, 1970 J. OSWALD 3,514,697

METHOD AND DEVICES FOR WAVE FREQUENCY DISCRIMINATION AND DIGITAL MEASUREMENT, USING SAMPLING AND LOGIC CIRCUITS

Filed March 27, 1967 3 Sheets-Sheet 2

11, 12, 13, 14, 15 : HALF-ADDERS

United States Patent Office 3,514,697

Patented May 26, 1970

3,514,697

METHOD AND DEVICES FOR WAVE FREQUENCY DISCRIMINATION AND DIGITAL MEASUREMENT, USING SAMPLING AND LOGIC CIRCUITS

Jacques Oswald, Versailles, France, assignor to C.I.T.-Compagnie Industriell des Telecommunications, Paris, France Filed Mar. 27, 1967, Ser. No. 626,079
Claims priority, application France, Apr. 4, 1966, 56,352; Mar. 10, 1967, 98,324
Int. Cl. G01r 23/02
U.S. Cl. 324—78 4 Claims

ABSTRACT OF THE DISCLOSURE

A method and a device for digital measuring of the ferquency of a periodic wave have two half-cycles of opposite polarities, in which samples taken from said wave at instants recurring with a short period are translated into binary signals of values depending on sample polarity, and in which such signals corresponding to sampling instants spaced by various multiples of said short period are combined into coded signals representing said frequency through logical "modulo 2" addition of pairs of such signals and selection of the majority value of a plurality of said coded signals corresponding to a number of consecutive samplings.

CROSS-REFERENCE TO RELATED APPLICATION

This application relates to developments based on principles partially disclosed in the copending U.S. patent application Ser. No. 454,048, filed May 7, 1965, in the name of the present applicant; its object is to show how these principles can be applied to the solution of more general problems, such as those of discriminating between any number of preassigned frequencies and measuring an unknown frequency located in a given band, with a known approximation and in digital coded form.

BACKGROUND OF THE INVENTION

Field of the invention

The present invention relates to new methods and devices which make it possible to recognize the frequency of a sinusoidal or quasi-sinusoidal electric wave among a plurality of possible predetermined frequencies or, if the unknown frequency may assume any value between predetermined lower and upper limit values $F_1$ and $F_{N+1}$, to measure the said frequency with an error smaller than a known fraction ($f/2$) of the difference ($F_{N+1}-F_1$) between these limit values, this being done by locating the unknown frequency in one of a number of intervals, the limit frequencies of which differ by $f$.

By "quasi-sinusoidal" wave will be hereinafter understood an alternating periodic wave the instantaneous amplitude of which retains a single polarity during each of its half-cycles, the latter polarity being different for two successive half-cycles.

The method of the invention makes use of a periodic sampling, with a given recurrence period, of this instantaneous amplitude, whereafter the polarity of each sample is translated into a binary signal having either of two values, hereafter conventionally designated as "0" and "1," according to the algebraic sign of the said polarity. The latter signals are subsequently submitted to a logical treatment, applied to a plurality of such signals respectively corresponding to samplings effected at instants spaced by predetermined time intervals. Through said treatment, the value of the unknown frequency is obtained in coded digital form.

Description of prior art

Methods and devices are already known, for instance from the already cited U.S. patent application 454,048 in the name of the present applicant, which allow to discriminate between two possible predetermined frequencies $F_1$ and $F_2$ of a received wave, that is to determine which of the latter frequencies is actually that of the said wave during a given time interval. According to these known methods, the wave is periodically sampled at recurring instants spaced by a constant time interval equal to ½ ($F_2-F_1$). Comparison of the polarities of two successive samples makes such an achievement possible by taking advantage of the fact that the time interval between two successive samplings will include, in the case of $F_1$ for instance, a given whole number or half-cycles at the latter frequency while, in the case of $F_2$, the same time interval will include the latter number plus one of such half-cycles (assuming $F_2$ to be higher than $F_1$). If in the first case the polarities of two successive samples are the same, they will be different in the second case, or conversely. Logic circuits receiving binary signals, the values of which depend on the polarity combination which actually takes place, will easily indicate the value of the corresponding frequency, the value $F_1$ being, by way of example, denoted by "0" and the value $F_2$ by "1" In the simplest code.

SUMMARY OF THE INVENTION

The invention relates to a generalization of the above-mentioned process that makes it applicable in the case where the unknown frequency F is capable of taking any one of a number of discrete values $F_1, F_2 \ldots F_{N+1}$, or even a continuously varying value between the lower and upper limits $F_1$ and $F_{N+1}$ of a given frequency band. The method of the invention, in the first case, makes it possible to determine which of the ($N+1$) possible discrete frequencies is the actually present one and, in the second case, to determine the numerical value of the frequency F within an error margin at most equal to a quantity ($f/2$) equal to $(F_{N+1}-F_1)/2N$. It will be assumed hereinafter that the frequency band ($F_{N+1}-F_N$) is divided into N equal fractional intervals of width $f$, and that each of the frequencies $F_2, F_3 \ldots F_N$ is comprised in a different one of said intervals.

According to the present invention, there is provided a method for discriminating and measuring in binary coded digital form, with a number $k$ of digits higher than unity, the spacing between a reference frequency $F_m$ and the unknown frequency F of a periodic electric wave having two successive half-cycles of opposite polarities, said unknown frequency being comprised between a lower limit $F_1$ and an upper limit $F_{N+1}$, within an error margin at most equal to $f/2=(F_{N+1}-F_1)/2N$, N being a whole number at most equal to $2^k$, said reference frequency being comprised in said band, according to which said wave is periodically sampled for its polarity at recurring instants spaced by $T_0/2^{k-1}\cdot n$, $n$ being a whole number at least equal to unity, the so obtained samples being translated into binary signals having either of the "0" and "1" values according to their polarities and the latter signals being stored for a time at least equal to $T_0$; said method being characterized in that said period $T_0$ is taken equal to $1/4f$, in that said frequency $F_m$ is taken equal to:

$$F_m=(2h-1)2^{k-1}f$$

$h$ being a whole number such that $F_m$ be comprised between $F_1$ and $F_{N+1}$, and that the larger of the quantities ($F_{N+1}-F_m$) and ($F_m-F_1$) be at most equal to ($2^{k-1}\cdot f$); and in that each binary signal corresponding to the sampling effected at a given instant $t$ is combined by "modulo 2" logical addition with each one of the $k$ binary signals respectively corresponding to the samplings effected at the instants $(t-T_0/2^{k-1})$, $(t-T_0/2^{k-2})$ . . . $(t-T_0)$, the results of said $k$ "modulo 2" additions constituting the above-mentioned $k$ digits after majority selection of their individual value by comparison of the values of each of said results corresponding to an odd whole number of consecutive samplings.

According to the present invention there is also provided a discriminating and measuring device for the unknown frequency F of a periodic electric wave, any two successive half-cycles of which are of opposite polarities, comprising:

A sampling device for taking samples of said wave at recurring time instants spaced by a recurrence period $T_0/2^{k-1}\cdot n$, ($k$ being a whole number larger than one and $n$ a whole number at least equal to unity) and for translating the polarity of each of said samples into a binary signal; a clock pulse source delivering recurring pulses with said period $T_0/2^{k-1}\cdot n$ and driving said sampling device;

A shift register having at least $2^k$ stages at the input of the first of which is applied said binary signal, and a shift line in said register controlled from said clock pulse source;

$k$ half-adders each having two inputs and an output, said inputs respectively receiving binary signals issued from stages of said register the ranks of which respectively differ by $n$, $2n$, . . . $2^{k-1}\cdot n$ for said half-adders taken respectively; and $k$ majority decision circuits each having an input respectively connected with the output of a corresponding one of said half-adders and an output connected with a corresponding one of $k$ terminals in a working circuit; each of said majority decision circuit delivering at its output a binary signal the value of which is equal to that of the majority of the signals issued from the half-adder connected with its input, each of latter said signals being respectively taken at one of an odd whole number of consecutive sampling instants.

Other objects and advantages of the invention will be apparent from the hereinafter given detailed description, and from the appended drawings.

DESCRIPTION OF PREFERRED EMBODIMENTS

Figure 1:
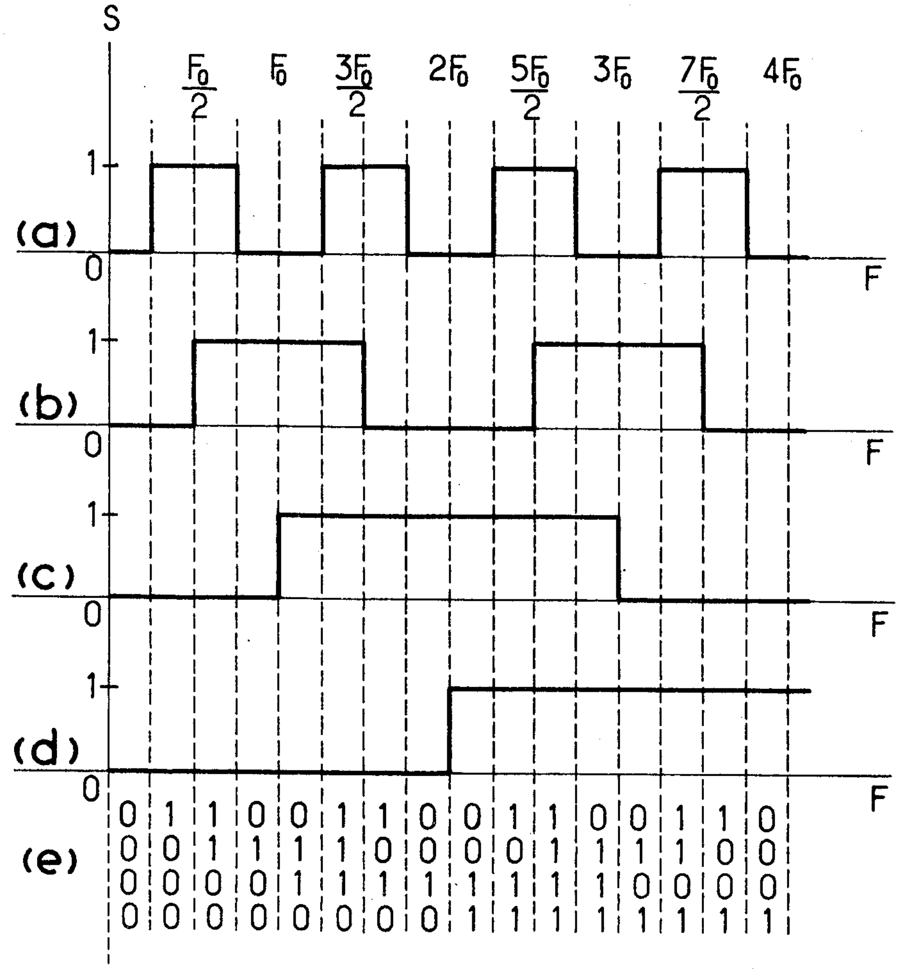
FIG. 1 is a graph showing how digital coding of the unknown frequency F of a periodic wave may be effected from samples periodically taken out of said wave and comparison results of their polarities, as well as from a majority decision taken by comparing several of said results successively obtained during a short time interval.

Referring first to FIG. 1, the latter shows, as a function of the unknown frequency F, the most probable value of the logical "modulo 2" sum S of the values of two binary signals respectively corresponding to samples taken at instants spaced by a given time interval. Each of said binary signals conventionally takes either of the "0" or the "1" value according to the polarity of the corresponding sample, and the sum $S$ takes one or the other of said values according to the actually present polarity combination. The respective values of the corresponding time intervals are, for the various ($a$), ($b$), ($c$) and ($d$) lines of FIG. 1:

for line ($a$): $T_0=1/F_0$
for line ($b$): $T_0/2=\frac{1}{2}F_0$
for line ($c$): $T_0/4=\frac{1}{4}F_0$; and
for line ($d$): $T_0/8=\frac{1}{8}F_0$.

Considering the case of line ($a$), it is obvious that, if periodic samplings are effected at a frequency $F_0$ on a wave having the same frequency $F_0$, any two successive samples will always be of the same polarity. Consequently, the above-mentioned binary signals will always be "0" signals, or always be "1" signals; and the "modulo 2" sum of their values will always be zero, according to the rules of Boolean algebra. The same situation prevails if F is a whole multiple of $F_0$.

On the contrary, if the frequency F of the wave is equal to $F_0/2$ or to an odd whole multiple of $F_0/2$, any two successive samples will always be of opposite polarities, and S will always take the "1" value.

An intermediate situation prevails if F is comprised, for instance, between $F_0/2$ and $F_0$. Assuming the phase of the samplings to be random, it is easily seen that the probability of having S equal to 1 is higher than ½ if F is closer to $F_0/2$ than to $F_0$, and lower than ½ if F is closer to $F_0$ than to $F_0/2$.

Assuming now that the operations which give the value of S be repeated several times at short time intervals during said period $T_0$ and that a majority decision process be applied to the choice of the value of S, the graph of line ($a$) of FIG. 1 is obtained for the most probable value of S as a function of F.

The same reasoning applies to graphs ($b$), ($c$) and ($d$), for the above-defined corresponding sampling periods.

Finally, the successive lines of table ($e$) of FIG. 1 show the numeral values retained for S through the majority decision process, for the various sampling periods corresponding to lines ($a$), ($b$), ($c$) and ($d$), respectively.

It is immediately seen that the digits of table ($e$) precisely represent, in reflected binary code, the value of F counted from a central frequency $F_m=2F_0$, with a frequency variation unit of the lowest significant order equal to $f=F_0/4$. It is also seen that the period $T_0$ is equal to $\frac{1}{4}f$ for line ($a$).

FIG. 1 thus corresponds to the case of $k=4$, the maximum measurable frequency being $F_{N+1}=4F_0$, and the minimum measurable frequency being the zero frequency. The total frequency bandwidth $4F_0$ is thus divided into 16 equal subbands, and the result of the coding consequently gives the value of F to an accuracy equal to $\frac{1}{32}$ of the total bandwidth, taking as nominal value of the measured frequency that of the middle frequency of the subband to which it pertains.

Any frequency comprised in said band of total width $4F_0$ may be coded with the same accuracy.

If any frequency to be considered is one of a series of predetermined discrete frequencies $F_1$, $F_2$, $F_3$ . . . $F_{16}$, respectively located in the subbands $(0, F_0/4)$, $(F_0/4, F_0/2)$, $(F_0/2, 3F_0/4)$ . . . $(15F_0/4, 4F_0)$, this frequency will be identified by the number corresponding to its digital coding.

Of course, it is by no means necessary that one of the limit frequencies of the band be the zero frequency. The band limits might as well be, for instance, $F_0$ and $4F_0$; but, in the latter case, the 4-digit binary code could not be completely taken advantage of. Generally speaking, if the maximum admissible error is taken equal to $f/2$, the possible digital coding is limited to a frequency band the half-width of which is at most equal to $2^{k-1}f$ on either side of a central frequency $F_m$ that must be an odd whole multiple of this half-width.

Figure 2:
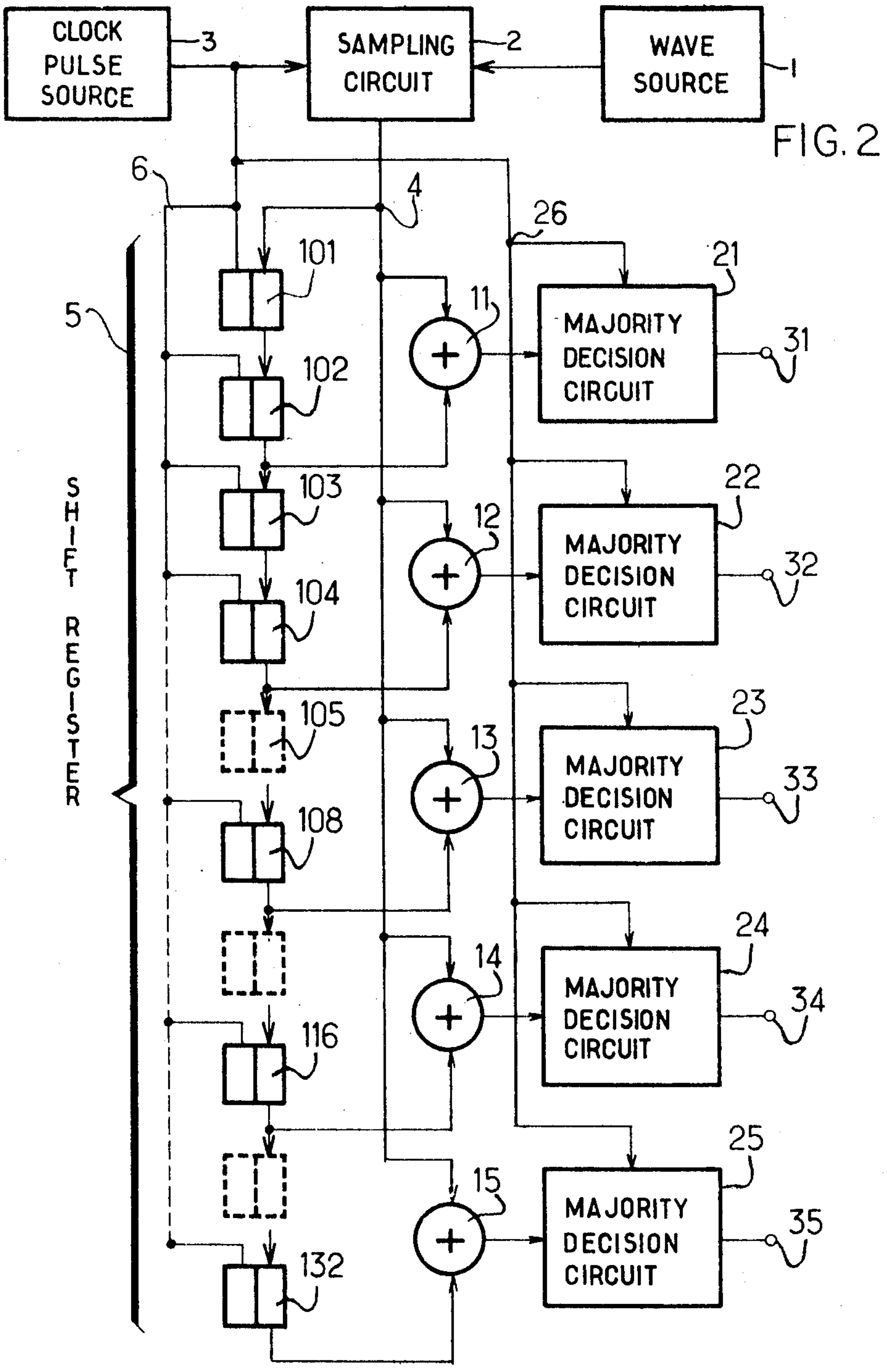
FIG. 2 is a diagram of a device for the embodiment of the method of the invention.

Referring now to FIG. 2, it is assumed, in this figure, that $k=5$ and $n=2$. FIG. 2 shows a circuit arrangement for the embodiment of the hereinabove explained coding method. In FIG. 2, a wave source 1 delivers the wave, the frequency of which is to be measured.

A sampling device 2 of any known type (for instance an amplitude modulator or an "AND" circuit) receives at one of its inputs the wave from 1 and at its other input sampling pulses of short duration supplied by the clock pulse source 3, with a recurrence period $T_0/32$, $T_0$ being equal to ¼$f$, and $f/2$ being the maximum admissible error on the unknown frequency F. The output of 3 delivers a binary signal having either of the values 0 and 1, according to the momentaneous polarity of the wave received from 1; the output of 3 is connected at point 4 to the input of the first stage of a shift register 5, here assumed to have 32 stages 101 to 132, each of which consists of a bistable circuit. The progression of the signals applied at 4 from each of said stages to the following one is ensured by the shift line 6 of the register 5, which is supplied with the pulses delivered by 3.

The signals respectively found at the input of 101 and at the output of 102 thus correspond to two sampling instant spaced by a time interval $T_0/16$; those respectively found at the input of 101 and at the output of 104 correspond, in a similar manner, to time instants differing by $T_0/8$, and so on. Finally, the signals at the input of 101 and at the output of 132 correspond to sampling instants differing by $T_0$.

The elements of each of the so defined signal pairs are respectively applied to the two inputs of each of the half-adders 11, 12, 13, 14 and 15. These half-adders, of a known type also designated as "exclusive OR" circuits and here conventionally represented by a cross inside a circle, perform the "modulo 2" logical addition of the values of the signals respectively applied to their two inputs (it is reminded here that the "modulo 2" logical addition follows the same rules as the conventional addition, except for the convention which makes the sum of two "1" signals equal to zero).

The outputs of the half-adders 11 to 15 are respectively connected with the inputs of the majority decision circuits 21 to 25, the operation of which is controlled, through the connection 26, by the clock pulse source 3. The part played by the circuits 21 to 25 is that of comparing the values of an odd number of signals corresponding to consecutive sampling instants and delivered to the input of each of said circuits by the half-adder connected therewith; the result of the comparison is a signal having the same value as the majority of the compared signals. The operating principle of such a majority decision circuit will be briefly reminded later on.

The outputs of the various circuits 21 to 25 are respectively connected with the five terminals 31 to 35, at which the binary coded signals representing the numerical value of the measured frequency appear.

Figure 3:
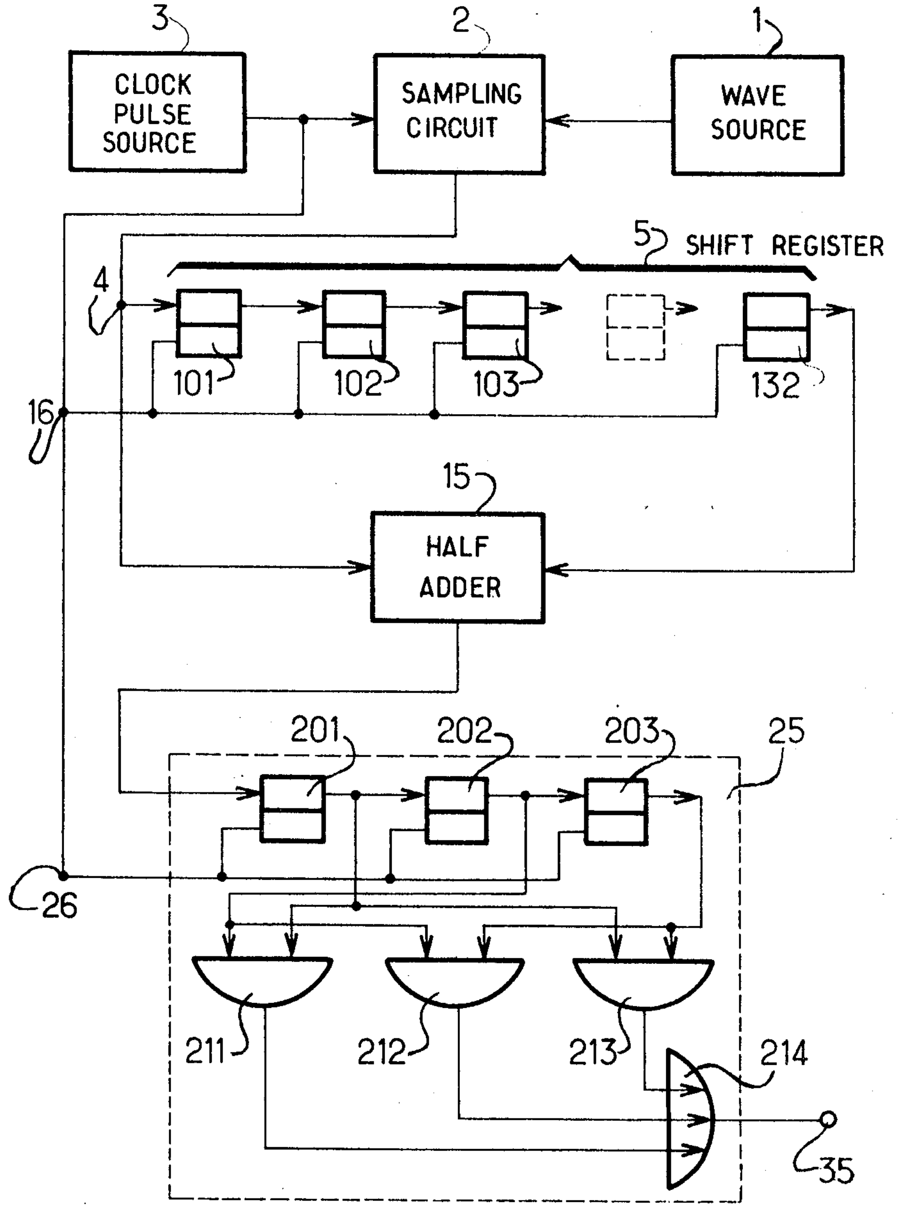
FIG. 3 is a diagram illustrating the constitution and operation of a majority decision circuit used in the arrangement of FIG. 2.

The operation of one of the majority decision circuits, by way of example circuit 25, will now be briefly explained with the aid of FIG. 3. In FIG. 3, the elements bearing reference numbers identical with those of FIG. 2 play the same part as in the latter.

The output of the half-adder 15 is connected with the input of the first stage 201 of a three-stage shift register 201, 202, 203 included in the circuit 25. The progression of the signals from each stage of the latter register to the following one is controlled by pulses delivered by the clock pulse source 3 through the connection 26 to a shift line controlling the stages 201 to 203, with which three "AND" circuits 211, 212, 213 are associated.

The outputs of the "AND" circuits 211, 212, 213 are respectively connected with the three inputs of an "OR" circuit 214, the output of which is connected with the output terminal 35 of the majority decision circuits 25 (FIGS. 2 and 3).

The system operates in the following manner:

If at a given instant the signals at the outputs of two of the stages 201, 202, 203 are "1" signals while the signal at the output of the remaining stage is a "0" signal, two of the "AND" circuits will deliver a "0" signal and the third "AND" circuit a "1" signal. Consequently, the "OR" circuit will deliver at its output a "1" signal, since one of its inputs only receives a "1" signal and the others a "0" signal. If, on the contrary, two of the stages 201, 202, 203 deliver a "0" signal at their output, while the third one delivers a "1" signal, all "AND" circuits will deliver "0" signals and, consequently, the "OR" circuit 214 will also deliver a "0" signal. It is thus shown that the signal received at 35 is always identical with the majority of the signals appearing at the ouputs of 201, 202 and 203.

Of course, many variants of such decision circuits may be imagined; for instance, more complicated devices, including five or seven register stages together with a corresponding number of "AND" and "OR" circuits, may be designed. Their operation will be all the more reliable that the number of the compared signals will be larger and that the number $n$ of samples taken during a time interval $T_0/2^{k-1}$ will also be larger, for a given number $k$ of code digits and a given maximum admissible value of the error in the measured frequency.

Coming back to FIG. 2, it will be obvious that the coded signals received at the output terminals 31 to 35 of the arrangement may be subsequently used in any known manner, for instance for visual display, for the control of relays, etc., either directly or after code translation, for instance into conventional binary code or decimal code. The five binary signals received at terminals 31 to 35 might also be combined in view of controlling a so-called "address decoder" with 32 output circuits, allowing any signal applied at its input to be selectively directed to one or the other of 32 utilization circuits, by means of a relay assembly conveniently designed for such a purpose. A large number of other possible applications will easily be imagined by the man skilled in the art.

What is claimed is:

1. A discriminating and measuring device for the unknown frequency F of a periodic electric wave, any two successive half-cycle of which are of opposite polarities, comprising:

a sampling device for taking samples of said wave at recurring time instants spaced by a recurrence period $T_0/2^{k-1}.n$, ($k$ being a whole number larger than one and $n$ a whole number at least equal to unity) and for translating the polarity of each of said samples into a binary signal; a clock pulse source delivering recurring pulses with said period $T_0/2^{k-1}.n$ and driving said sampling device;

a shift register having at least $2^k$ stages at the input of the first of which is applied said binary signal, and a shift line in said register controlled from said clock pulse source:

$k$ half-adders each having two inputs and an output, said inputs respectively receiving binary signals issued from stages of said register the ranks of which respectively differ by $n$, $2n$, . . . $2^{k-1}.n$ for said half-adders taken respectively; and $k$ majority decision circuits each having an input respectively connected with the output of a corresponding one of said half-adders and an output connected with a corresponding one of $k$ terminals in a working circuit; each of said majority decision circuit delivering at its output a binary signal the value of which is equal to that of the majority of the signals issued from the half-adder connected with its input, each of latter said signals being respectively taken at one of an odd whole number consecutive sampling instants;

in which each of said majority decision circuits includes an auxiliary shift register having an odd number of stages and a shift line controlled by said clock pulse source, means for connecting the input of the first stage of said auxiliary register to the output of one of said half-adders, a plurality of "AND" circuits each having two inputs respectively connected with two different ones of the outputs of said stages of said auxiliary register, and at least an "OR" circuit having a plurality of inputs respectively connected with the outputs of at least part of said "AND" circuits and an output connected with a utilization terminal for said majority decision circuit.

2. A device as claimed in claim 1, in which said sampling device consists of an amplitude modulator.

3. A device as claimed in claim 1, in which said sampling device consists of an "AND" circuit.

4. A device as claimed in claim 1, in which each of said half-adders consists of an "exclusive OR" circuit.

References Cited

UNITED STATES PATENTS

| | | | |
|---|---|---|---|
| 3,189,820 | 6/1965 | Lowman | 324—78 X |
| 3,297,951 | 1/1967 | Blasbalg | 328—37 |

RUDOLPH V. ROLINEC, Primary Examiner

P. F. WILLE, Assistant Examiner

U.S. Cl. X.R.

328—37

PO-1050
(5/69)

UNITED STATES PATENT OFFICE
CERTIFICATE OF CORRECTION

Patent No. 3,514,697 Dated May 26, 1970

Inventor(s) Jacques Oswald

It is certified that error appears in the above-identified patent and that said Letters Patent are hereby corrected as shown below:

In the heading, in the name of the assignee, the word "Industriell" should read --Industrielle--;

Col. 1, line 16 (2nd line of Abstract), "ferquency" should read --frequency--;

Col. 4, line 29, "numeral" should read --numerical--;

Col. 6, line 36, "half-cycle" should read --half-cycles--; line 65, the word --of-- should be inserted after "number";

Col. 7, line 9, the word --one-- should be inserted after "each".

SIGNED AND SEALED

OCT 27 1970

(SEAL)
Attest:

Edward M. Fletcher, Jr.
Attesting Officer

WILLIAM E. SCHUYLER, JR.
Commissioner of Patents